United States Patent [19]

Teeter

[11] 3,769,633

[45] Oct. 30, 1973

[54] RAINDROP IMAGE RECORDING ANALYZER SYSTEM

[75] Inventor: Wallis L. Teeter, Ridgecrest, Calif.

[73] Assignee: The United States of America as represented by the Secretary of the Navy, Washington, D.C.

[22] Filed: May 11, 1972

[21] Appl. No.: 252,400

[52] U.S. Cl. ........ 346/107 R, 250/213 UT, 356/102
[51] Int. Cl. .................................................. G01d
[58] Field of Search ................. 346/107 R; 356/102; 250/213 UT; 178/6, DIG. 1, DIG. 36, DIG. 38; 95/12.5; 352/84; 73/170 R, 28; 235/92 PC

[56] References Cited
UNITED STATES PATENTS

| 2,779,233 | 1/1957 | Dodge et al. ................. 346/107 R X |
| 3,153,727 | 10/1964 | Nathan ........................ 235/92 PC X |
| 3,181,169 | 4/1965 | Marchal et al. ................. 346/107 R |
| 3,275,744 | 9/1966 | Dietrich .................................. 178/6 |
| 3,527,533 | 9/1970 | Hoor et al. ........................ 95/12.5 X |

Primary Examiner—Joseph W. Hartary
Attorney—R. S. Sciascia et al.

[57] ABSTRACT

A method and apparatus is disclosed for measuring the density size, shape and distribution of rain, snow, hail, sleet and the like in the atmosphere. A preferred embodiment of the apparatus utilizes a gated image (channel plate) intensifier mounted in an aircraft and an outboard high intensity light. The light establishes a defined volume which is examined by the image intensifier for a time interval on the order of a microsecond or less. The image is retained by the intensifier tube while a high speed camera or other means photographs or scans the surface to provide a record.

1 Claim, 5 Drawing Figures

PATENTED OCT 30 1973

250 # RAINDROP IMAGE RECORDING ANALYZER SYSTEM

BACKGROUND OF THE INVENTION

As a part of studying the periodicity and regularity of certain high-altitude backscatters, it was necessary to properly indentify the physical environment occuring in potentially active rain clouds. Prior efforts to obtain such measurements in the upper altitudes have generally involved the use of accoustic transducers as a sensing mechanism or a mechanical impactor device. These prior devices, however, did not provide a sufficiently large volume sample to satisfy present needs.

The method and apparatus according to this invention has the potential of recording volumetric samples of greater than 50 cubic meters per second and accumulating approximately 18,000 cubic meters volume for each recording camera loading. Further refinements in the system could increase this output by many orders of magnitude.

In the preferred embodiment a gated image intensifier system is used. A controlled xenon or other light source in one wing of the aircraft illuminates a defined volume. This defined volume is electrically photographed through a lens system on a periodic basis by the gated channel plate image intensifier. A synchronized high speed camera or other means then photographs the image tube surface suing high resultion film or recording means. The developed film shows raindrops located in the defined volume of a frame by frame basis with drop shapes and sizes clearly delineated from fractions of a millimeter for measurement depending on the system geometry.

The camera may be replaced by an image dissector or scanner and the images therefrom passed through a sorting mechanism categorizing drop images into spacific size and shape packages for display on separate visual meters or recorders. An observer may thus have a plurality of visual readouts continuously indicating the number of raindrops per specific size per cubic meter of sampled volume in real time. This real time system is essential for categorizing drop distribution in immediate decision making such as weather modification performance verification.

The purpose of the Raindrop Analyzer System disclosed herein is to measure the size, shape and distribution of droplets (or similar type object) contained within a specified volume of space. The measurement data, when assembled in either real time readout form or historical profile form, provides physical data of particular interest to Earth Resources and Weather Modification Reasearch personnel, and her personnel needing specific fine grain physical science data. The measurement data in real time readout is particularly useful for weather modification personnel to measure the immediate precipitation-producing effect of chemicalm, mechanical and electrical additives to potential rain clouds.

DETAILED DESCRIPTION OF THE INVENTION

Figure 1:
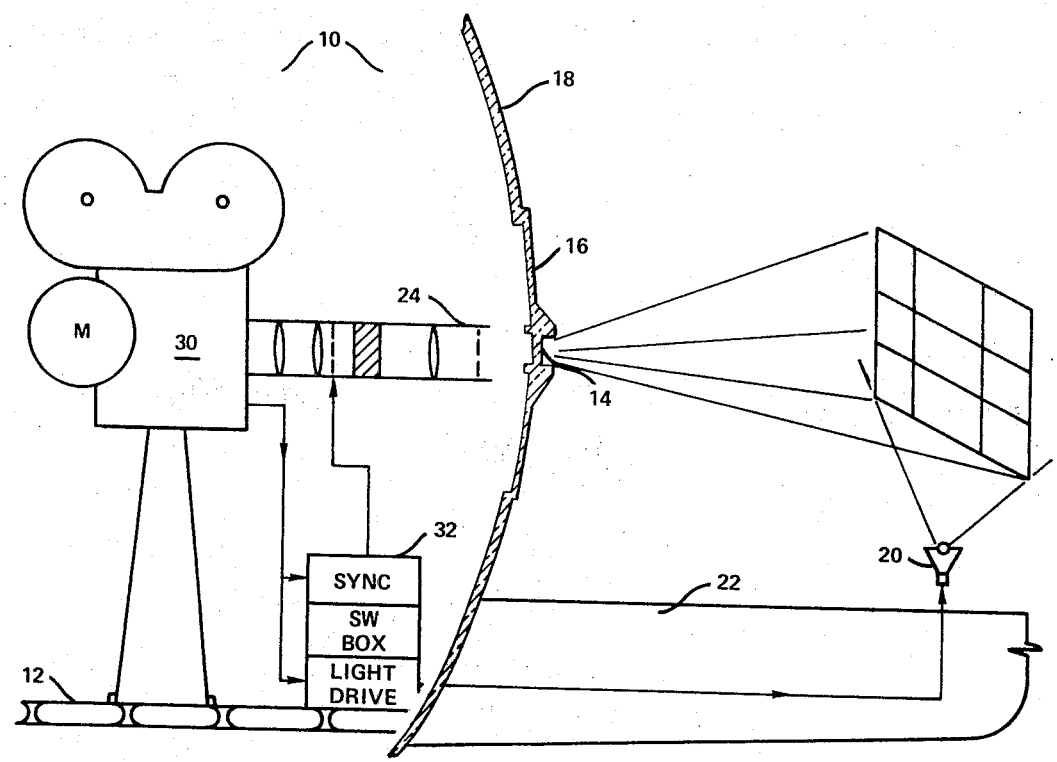
FIG. 1 is a schematic illustration of a practical embodiment of the invention installed in an aircraft.

As shown in FIG. 1 the system 10 is set up on the deck 12 of an aircraft fuselage and is shown looking through an optical window 14 whown mounted in one of the windows 16 on the side 18 of the aircaft fuselage. A xenon lamp 20 mounted on wing 22 illuminates the view. Images seen through window 14 pass through a gated channel plate image intensifier 24 to a recording means such a camera 30. The lamp 20, image intensifier 24 and camera 30 are interconnected by a synchronization means 32.

Figure 3:
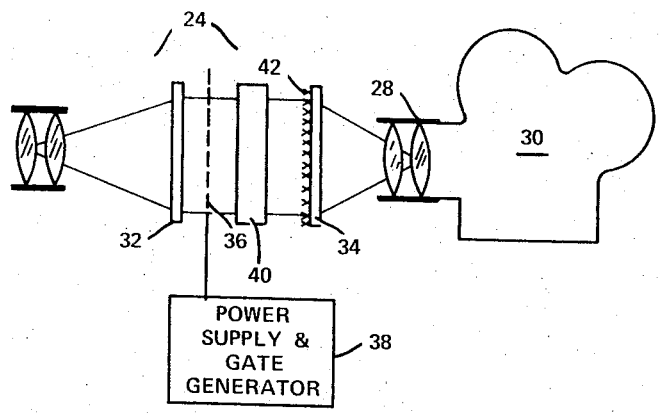
FIG. 3 is a schematic detail of a portion of FIG. 1.

As shown in FIG. 3, the image intensifier 24 is housed between front and back plano windows 32, 34 and includes a photocathode 36 connected to a power supply and a gate generator 38. The image intensifier also includes amplifier (electron accelerator) 40 and the rear window 34 is coated with a phosphor 42.

The gated image intensifier system provides a capability to sequentially photograph specific identified volumes containing raindrops or similar type objects in an air space adjacent to an airplane in flight and, thus, to determine the density, size, and shape of the objects as correlated with various weather environment and cloud conditions.

Figure 2:
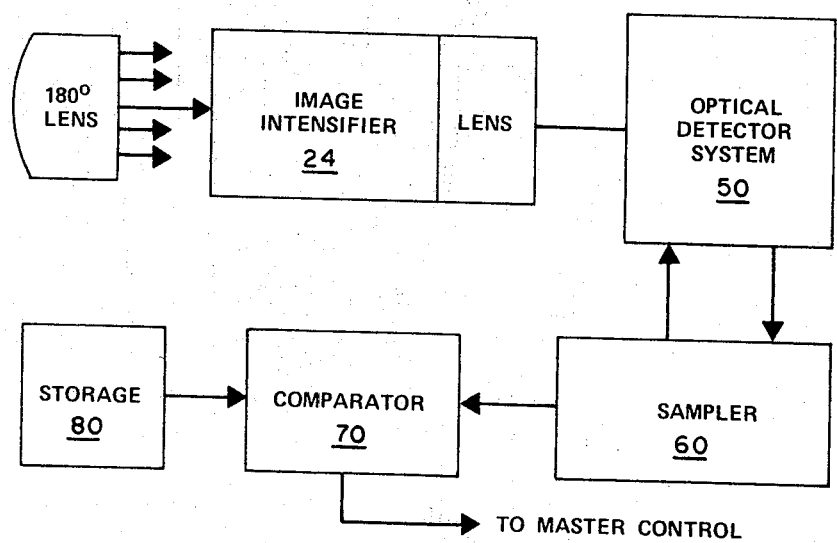
FIG. 2 is a block diagram of a second embodiment of the invention.

FIG. 2 illustrates an embodiment of the invention wherein images detected by the optical system are automatically compared with previous samples and at the same time stored for future reference. Images from intensifier 24 are received by an optical detector system 50. A sampler 60 is connected to the detector system 50 to command and receive samples of images being received by system 50. These samples may then be compared by means of a comparator 70 with prerecorded samples from storage means 80.

Items 50, 60, 70 and 80 may be off the shelf video and computer components but higher resolution of smaller particles requires scanning capabilities achieved only in custom equipment. Information from the comparator when relayed to a master control station enables the operator to make a decision based on the real time situation.

Figure 4:
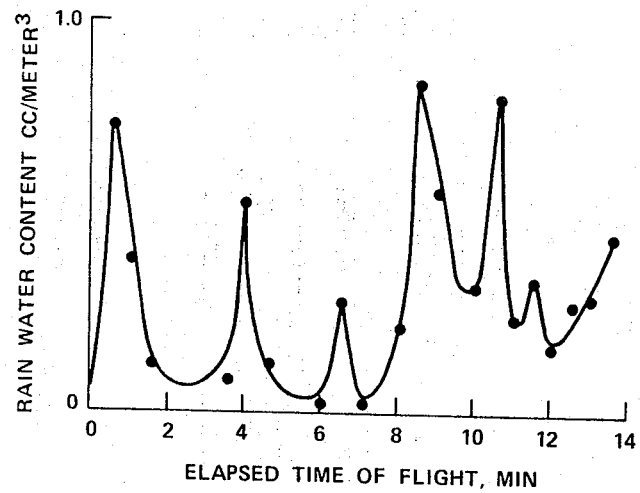
FIG. 4 is a profile chart.

FIG. 4 illustrates the rain water content of a light thunder shower as recorded during 14 minutes on the evening of 25 June 1970.

Figure 5:
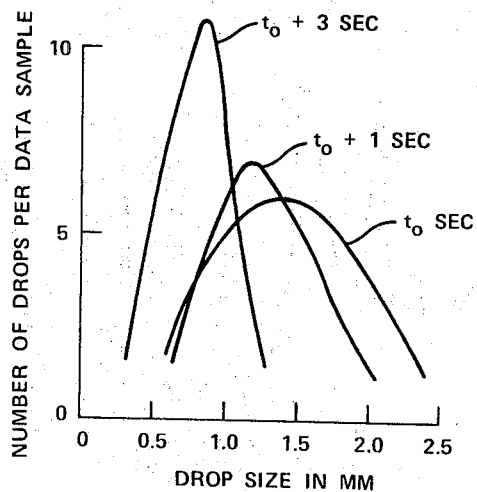
FIG. 5 is a graph of three successive test plots.

The profile data was provided by an acoustic impactor and was used in this test to indicate areas of high activity and for comparison. FIG. 5 shows three typical successive plots where each represents a one second data sample from the image intensifier system according to the present invention taken during one minute of a flight test period. Time $t_o$ is arbitrary for this illustration but represents a fine cut occurring during the downslope portion of the first peak. Note that the FIG. 5 data shows a larger drop size distribution at $t_o$ and the successively smaller drop size distributions for $t_o$ plus one second and $t_o$ plus three seconds.

From the above, it is clear that applicant has provided a method and apparatus for analyzing and classifying images which may be applied to rain, snow, hail, etc., appearing in the atmosphere and exhibiting various and peculiar shapes, sizes and contours.

What is claimed is:

1. Apparatus for recroding an image to be used in the measurement of density, size, shape and distribution of rain, snow, hail, sleet and the like in the atmosphere comprising:
an image intensifier tube having in its optical field of view a defined volume of said atmosphere;
said tube including a phosphor plate, an amplifier and a photocathode for electrically producing an image of said volume;
gating means connected to said photocathode; means for illuminating said field of view of said tube;
means including a photographic camera for recording said image; and
synchronization means connected to said illumination means, said recording means and said photocathode gating means for synchronizing the gating of said photocathode with the illumination of said field of view and the recording of said image:
said field of view, said tube and said recording means being aligned to form an optical path of said images.

* * * * *